United States Patent
Wild et al.

(10) Patent No.: US 9,660,338 B2
(45) Date of Patent: May 23, 2017

(54) METHOD FOR MULTI-ANTENNA SIGNAL PROCESSING AT AN ANTENNA ELEMENT ARRANGEMENT, CORRESPONDING TRANSCEIVER AND CORRESPONDING ANTENNA ELEMENT ARRANGEMENT

(75) Inventors: Thorsten Wild, Stuttgart (DE); Michael Ohm, Stuttgart (DE); Cornelis Hoek, Tamm (DE)

(73) Assignee: Alcatel Lucent, Boulogne-Billancourt (FR)

( * ) Notice: Subject to any disclaimer, the term of this patent is extended or adjusted under 35 U.S.C. 154(b) by 1260 days.

(21) Appl. No.: 13/002,162

(22) PCT Filed: Jul. 16, 2009

(86) PCT No.: PCT/EP2009/059171
§ 371 (c)(1),
(2), (4) Date: May 11, 2011

(87) PCT Pub. No.: WO2010/025984
PCT Pub. Date: Mar. 11, 2010

(65) Prior Publication Data
US 2011/0212695 A1    Sep. 1, 2011

(30) Foreign Application Priority Data

Sep. 4, 2008 (EP) .................................... 08290832
Jan. 21, 2009 (EP) .................................... 09305054

(51) Int. Cl.
*H01Q 3/00* (2006.01)
*H01Q 3/26* (2006.01)
(Continued)

(52) U.S. Cl.
CPC .............. *H01Q 3/26* (2013.01); *H04B 7/024* (2013.01); *H04B 7/0617* (2013.01); *H04B 7/086* (2013.01);
(Continued)

(58) Field of Classification Search
CPC .......... H01Q 3/26; H01Q 21/061; H01Q 3/40; H04B 7/024; H04B 7/0617; H04B 7/0413; H04B 7/0408; H04B 7/26
(Continued)

(56) References Cited

U.S. PATENT DOCUMENTS 5,101,501 A * 3/1992 Gilhousen et al. ........... 455/442
5,754,138 A   5/1998 Turcotte et al.
(Continued)

FOREIGN PATENT DOCUMENTS

CN    1759617 A    4/2006
JP    10-145131    5/1998
(Continued)

OTHER PUBLICATIONS

English Bibliography for Chinese Patent App. Publication No. CN1759617A, published Apr. 12, 2006, printed from Thomson Innovation on Jul. 21, 2013, 9 pp.
(Continued)

*Primary Examiner* — Chuong P Nguyen
(74) *Attorney, Agent, or Firm* — Fay Sharpe, LLP

(57) ABSTRACT

The present invention relates to a method for multi-antenna signal processing at an antenna element arrangement belonging to a transceiver of a radio communication network, the antenna element arrangement comprising antenna elements (211, 221, 231, 241) in horizontal and in vertical direction, wherein complex antenna weights are applied to said antenna elements.

8 Claims, 8 Drawing Sheets

(51) Int. Cl.
*H04B 7/024* (2017.01)
*H04B 7/06* (2006.01)
*H04B 7/08* (2006.01)
*H01Q 1/24* (2006.01)
*H01Q 21/06* (2006.01)
*H04B 7/10* (2017.01)

(52) U.S. Cl.
CPC .......... *H01Q 1/246* (2013.01); *H01Q 21/061* (2013.01); *H04B 7/10* (2013.01)

(58) Field of Classification Search
USPC ............... 342/372, 377; 455/526.1, 524, 436
See application file for complete search history.

(56) References Cited

U.S. PATENT DOCUMENTS

| | | | |
|---|---|---|---|
| 5,905,462 A * | 5/1999 | Hampel et al. | 342/372 |
| 6,950,678 B1 * | 9/2005 | Mujtaba et al. | 455/562.1 |
| 7,242,362 B2 * | 7/2007 | Hulkkonen | H01Q 1/246 343/853 |
| 8,805,283 B2 * | 8/2014 | Yeh, II | H04B 7/024 455/426.1 |
| 2002/0118781 A1 * | 8/2002 | Thomas et al. | 375/347 |
| 2004/0229651 A1 * | 11/2004 | Hulkkonen et al. | 455/562.1 |
| 2005/0259005 A1 * | 11/2005 | Chiang et al. | 342/373 |
| 2007/0142067 A1 * | 6/2007 | Cheng et al. | 455/512 |
| 2008/0057932 A1 * | 3/2008 | Brunner | H04W 16/06 455/422.1 |
| 2008/0318613 A1 | 12/2008 | Balachandran et al. | |
| 2009/0010356 A1 * | 1/2009 | Engstrom et al. | 375/267 |
| 2009/0058725 A1 * | 3/2009 | Barker et al. | 342/372 |
| 2009/0238292 A1 * | 9/2009 | Clerckx | H04B 7/043 375/260 |
| 2010/0189055 A1 * | 7/2010 | Ylitalo | 370/329 |
| 2010/0255852 A1 * | 10/2010 | Chen | H04W 72/082 455/450 |
| 2013/0194950 A1 * | 8/2013 | Haghighat | H04W 72/1289 370/252 |
| 2013/0237218 A1 * | 9/2013 | Li | H04W 48/16 455/434 |

FOREIGN PATENT DOCUMENTS

| | | |
|---|---|---|
| JP | 2002-151936 | 5/2002 |
| JP | 2009-522885 | 6/2009 |
| KR | 2002-0031955 | 5/2002 |
| WO | 2004100432 A2 | 11/2004 |
| WO | WO 2007/076895 A | 7/2007 |
| WO | WO 2007/091024 A | 8/2007 |
| WO | 2008057290 A1 | 5/2008 |

OTHER PUBLICATIONS

Yang Song, Lieya Cai, Keying Wu, Hongwei Yang: "Collaborative MIMO, IEEE C802.16m-07/244rl," IEEE 802.16 Broadband Wireless Access Working Group, XP002547035, pp. 1-9, Nov. 7, 2007.
International Search Report for PCT/EP2009/059171 dated Oct. 2, 2009.

* cited by examiner

Fig. 1 - Prior Art

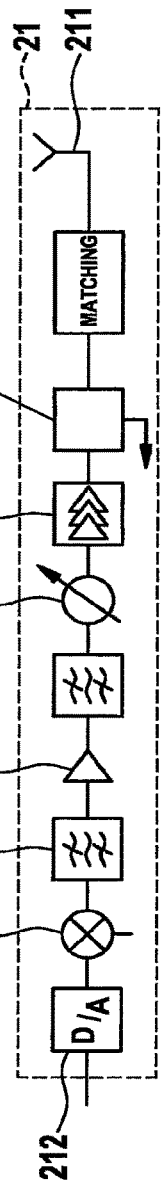
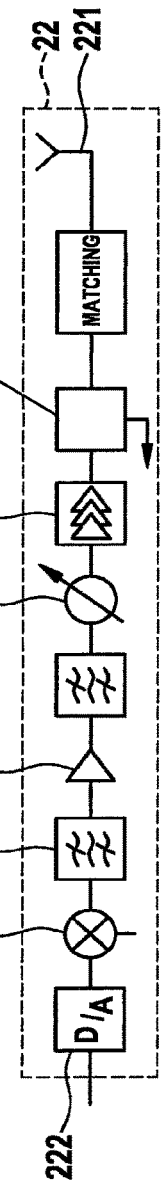
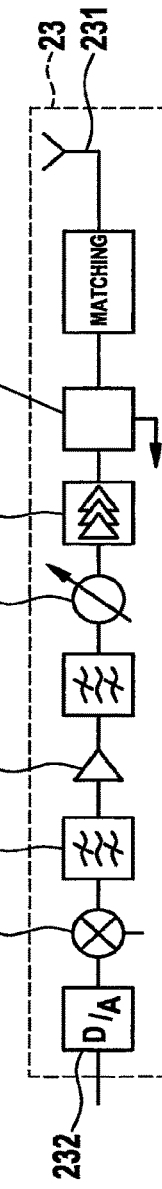
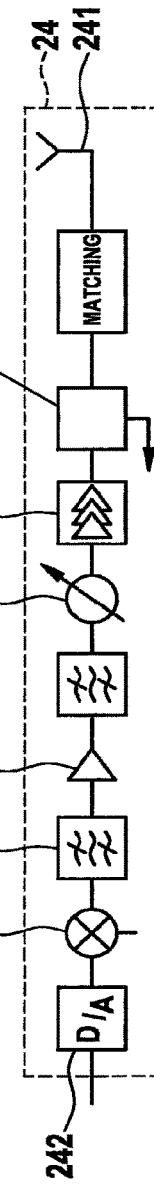
Fig. 2

$$w_{i1} = \exp(-jkr_i \cdot \hat{r}) \longrightarrow Y \overbrace{\phantom{xxx}}^{811}$$

$$w_{i2} = \exp(-jkr_i \cdot \hat{r}) \longrightarrow Y \overbrace{\phantom{xxx}}^{821}$$

Fig. 9

METHOD FOR MULTI-ANTENNA SIGNAL PROCESSING AT AN ANTENNA ELEMENT ARRANGEMENT, CORRESPONDING TRANSCEIVER AND CORRESPONDING ANTENNA ELEMENT ARRANGEMENT

This application is a U.S. national filing of PCT Application No. PCT/EP2009/059171 which is based on and claims priority to priority applications EP 08290832.8, filed Sep. 4, 2008, and EP 09305054.0, filed Jan. 21, 2009, all of which are incorporated herein by reference in their entirety.

BACKGROUND OF THE INVENTION

The present invention relates to a method for multi antenna processing at an antenna element arrangement.

Radio communication networks are equipped with base stations comprising antennas adapted to cover a predefined area of the network. The coverage provided by the antennas should be optimized in order to minimize the number of base station on the one hand while ensuring a good coverage especially on critical parts of the networks (highways, towns, . . . ). Due to the constraints in term of location for the base stations, it is necessary to be able to fine tune the coverage at the antenna level. For this purpose a downtilt which represents the inclination of the antenna in the elevation direction is calculated to provide the appropriate coverage. This downtilt is either fixed and mechanically preset on site or can be remotely modified using a remote control motor able to move the antenna in the elevation direction.

New radio communication networks have the requirement to provide more efficient services in term of bit rate and in term of capacity. For achieving this some new methods based on multiple antennas at a base station site have been proposed which tend to parallelize the data transmission (to reach higher bitrate) while limiting the interference (to ensure high capacity). MINK) and beamforming are such methods.

It is a particular object of the present invention to provide a way of further improving multiple antenna signal processing especially in view of MIMO processing, beamforming or interference coordination in new radio communication networks.

Other objects of the invention are to provide a corresponding transceiver and a corresponding antenna element arrangement.

SUMMARY OF THE INVENTION

These objects, and others that appear below, are achieved by a method for multiple-antenna signal processing at an antenna element arrangement, a transceiver adapted to perform multi-antenna signal processing in a radio communication network and an antenna element arrangement.

According to the present invention, a method for multiple-antenna signal processing can adapt the orientation of beams in the azimuth as well as in the elevation direction in the context of an antenna element arrangement extending in the horizontal as well as in the vertical direction. The orientation of the beams is reached by applying appropriate complex antenna weights to the different antenna elements.

This invention presents the advantage that a beam can not only be oriented in the azimuth direction depending on where a user is located in an horizontal plane but also in the elevation direction so as to point the beams selectively to a user. A different elevation angle will be applied if a user is for example in an higher floor of a building, in an airplane or if the user is close or far from the base station.

The orientation in the elevation direction is reached by applying complex antenna weights to each of the antenna elements so that a pure software solution is put in place without any mechanical move of the antenna elements. The complex antenna weights are either predefined antenna weights part of a codebook or adaptive non-codebook based antenna weights computed at the base station.

This invention presents the advantage to improve the system's performance. Due to the directivity, the antenna arrangement gain is improved and results in a stronger received signal. Alternatively, a lower transmit power is necessary for reaching the same received power as in prior art, in this case, lower inter cell interference is experienced in the system and the system capacity can be increased. Moreover, due to an improved spatial separability of the users, the intro cell interference is also reduced.

This invention further presents the advantage to enable more flexible MIMO (Multiple Input Multiple Output) algorithms in that the azimuth and elevation directions can be exploited individually for each user in the time and frequency direction. For example, a 2-dimensional nullsteering or zero forcing results in an increased in comparison with 1-dimensional nullsteering cell interference reduction in case of multi-user MIMO. The 2 dimensional complex antenna weights control enables it to combine spatial multiplexing and linear precoding for Single-user MIMO. Further advantages can be obtained in relation with multi-site coordinated MIMO as network MIMO or collaborative MIMO.

This invention further presents the advantage to improve the inter-cell interference coordination algorithms.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which:

FIG. 2 shows a transceiver baseband signal processing chain/antenna element arrangement part of a transceiver according to the present invention;

FIG. 9 shows an example of first and second complex antenna weights.

DETAILED DESCRIPTION OF THE INVENTION

Figure 1:
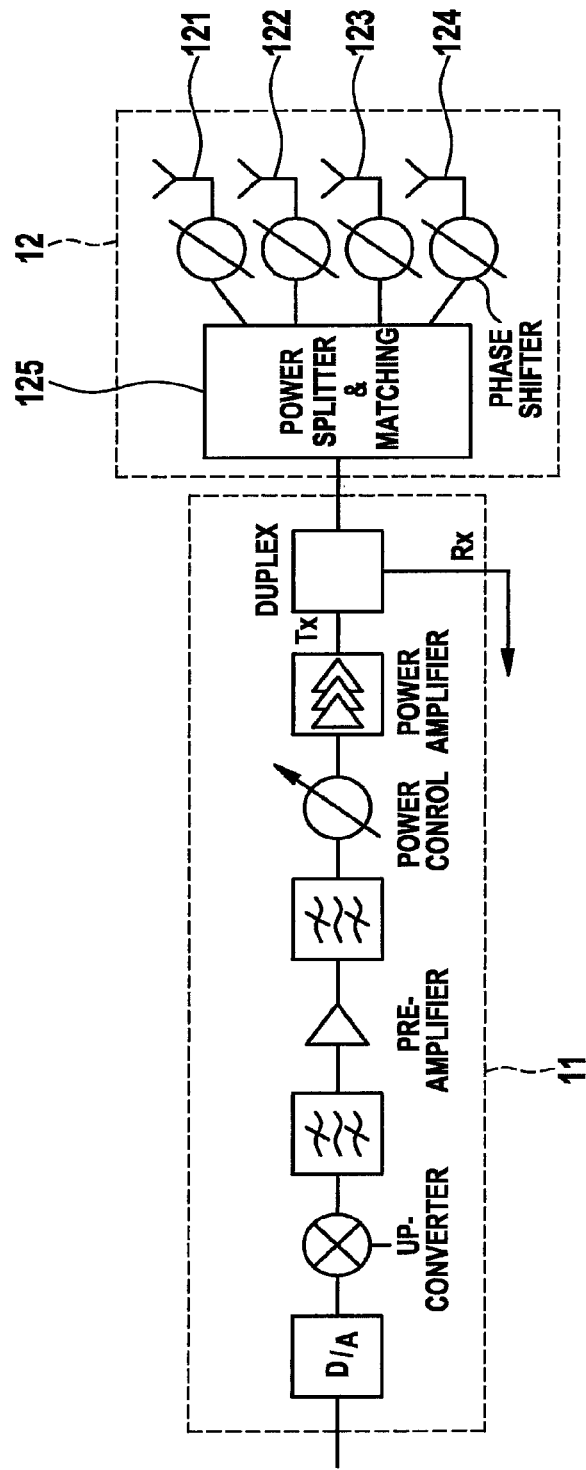
FIG. 1 shows a transceiver baseband signal processing chain/antenna element arrangement part of a transceiver as known in prior art.

FIG. 1 shows a transceiver processing chain 11 and an antenna element arrangement 12 as known in prior art. The processing chain 11 receives as input a baseband signal or a sum of multiple baseband signal components. The digital baseband signal is converted to analog signal upconverted to become an RF signal, filtered, preamplified, power controlled and amplified in the processing chain. A part of the signal at the output of the amplifier is fed back for retro loop control purpose and the main part of the signal is submitted to antenna element arrangement 12.

Antenna element arrangement 12 comprises four vertically stacked antenna elements 121, . . . , 124. It will be clear for those skilled in the art that any number of antenna elements can be vertically stacked. Moreover, several horizontally arranged sets of vertically stacked antenna elements 121, . . . , 124 can be connected in parallel to the processing chain 11. On FIG. 1 only one set is represented.

Inside antenna element arrangement 12, a power splitter and matching module 125 is responsible for distributing the input power over the different antenna elements 121, . . . , 124. One phase shifter per antenna is also responsible for applying a phase shift to the different signals to be transmitted over the different antennas.

Due to the fact that a single baseband signal processing chain is used for determining the settings of an antenna elements 121, . . . , 124, the antenna element weights applied to the baseband signal components are chosen in such a way that the desired fixed antenna downtilt is achieved.
Different antenna element weights can be used for other antenna element sets.
More precisely, when sector antennas have one transceiver chain for each column of elements positioned in z-direction. The downtilt is fixed to $\Theta_d$ for all users and all subcarriers and can only slowly be changed in time.
Main lobe steering for 1-D beamforming in principal is the same as above, thus for the i-th antenna element, this can be written as:

$w_i = \exp(-jkr_i \cdot \hat{r})$

As there is only one transceiver chain per column of elements, the weights calculated in the baseband for each one of the M elements in a column is identical:

$w_{BB,3} = w_{BB,2} = \ldots = w_{BB,m}$

There is no control of each individual element.
Main lobe steering can only be realized in the azimuth direction.
With $$L = \frac{l}{M}$$

columns, L baseband weights can be generated, with the i-th weight being:

$w_i = \exp(-jk(y_i \sin \phi))$

Together with the fixed downtilt $\Theta_d$, the effective weights per element are:

$w_i = \exp(-jk(y_i \sin \phi \sin \Theta_d + z_i \cos \Theta_d))$

FIG. 2 shows a transceiver baseband signal processing chain/antenna element arrangement according to the present invention.

The transceiver comprises several processing chains 21, . . . , 24, each of them connected to an antenna element 211, . . . , 241, The number of processing chains depends on the number of antenna elements of the transceiver. All processing chains 21, . . . , 24 receive as input a sum of weighted baseband signal components with different complex weights applied to each of the baseband signal components. The digital baseband signal is converted to analog signal at module 212, . . . , 242, upconverted at module 213, . . . , 243, filtered at module 214, . . . , 244, pre-amplified at module 215, . . . , 245, power controlled at module 216, . . . , 246 and amplified at amplifier 217, . . . , 247 in the parallel processing chains. A part of the signal at the output of amplifier 217, . . . , 247 is fed back for retro loop control purpose and the main part of the signal is submitted to antenna element arrangement 211, . . . , 241.

According to the present invention each antenna element 211, . . . , 241 should correspond to an individual complex antenna weight for each baseband component. For this purpose, it is necessary that each antenna element 211, . . . , 241 is controlled by a separate processing chain 21, . . . , 24. The different antenna weights are preferably applied to each baseband signal input to each processing chains 21, . . . , 24.

Using this architecture of the transceiver enables it to control independently the different antenna elements, to use different antenna element weights for each antenna element and consequently being able to have a three dimension control over the horizontally and vertically arranged antenna elements for each baseband component.

It will be understood by those skilled in the art that the processing chain can be adapted to reach the some effect of being able to assign individual antenna element weights to each antenna element. Not all modules described as part of the processing chain are necessary to reach this effect so that some of these modules may be omitted while remaining under the scope of the present invention.

Several applications may be envisaged based on the previously described inventions. The main applications of the present invention to beamforming, MIMO and interference coordination will be detailed in the following.

Figure 3:
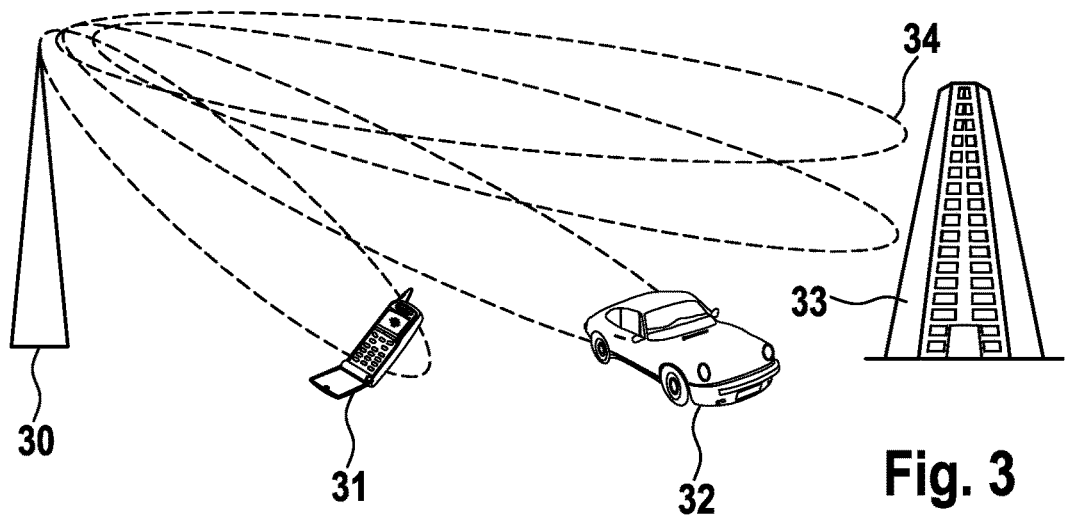
FIG. 3 shows an application of the present invention to beamforming.

FIG. 3 shows an application of the present invention to beamforming. It is a prerequisite that the base station 30 is equipped with an antenna element arrangement according to the present invention so either an horizontally arranged set of vertically stacked antenna elements or a 2 dimensional antenna array showing a horizontal and a vertical extension.

Depending on the location of the terminal relative to the base station: a mobile phone 31 near to the base station, a car 32 having a higher distance to the base station or end-users 33, 34 located at the $10^{th}$ respectively the $20^{th}$ floor of a building, the orientation of the beam generated at the base station antenna arrangement need to be adapted in the elevation and azimuth direction to be able to reach each terminal with the best accuracy. The orientation in the elevation direction is obtained by applying appropriate antenna element weights to the different antenna elements of the antenna element arrangement of base station 30.

This orientation of the beam in the elevation direction can be combined with the already state of the art orientation on the beam in the azimuth direction so that horizontal as well as vertical antenna patterns are generated and controlled over baseband signal processing. Such a solution allows to maximize the antenna array gain and increasing the received power level at the terminals 31, . . . , 34 and preferably reducing the intra-cell interference at the other terminals in multi-user operation.
Preferably, the location of the user terminal (distance to the base station, azimuth angle, elevation angle) relative to the base station is reported to the base station so that it can calculate the appropriate complex antenna weights to apply to the different antenna elements to generate a beam pointing exactly in the direction of the user. A possible method for calculating complex antenna weights consists in determining a weight vector in order to steer to a certain direction. $\hat{r}$ is called the steering vector. For the i-th antenna element, this can be written as $w_i=\exp(-jkr_i\cdot\hat{r})=\exp(y_i \sin \phi \sin \Theta + z_i \cos \Theta)$. This takes into account one transceiver chain for each element in this y,z-plane.

In an OFDM-system the weights can be changed individually per user, per OFDM symbol and per subcarrier to steer a beam in the desired $\phi$ and $\Theta$ direction). The complex antenna weights are either predefined antenna weights part of a codebook or adaptive non-codebook based antenna weights computed at the base station.

Figure 4:
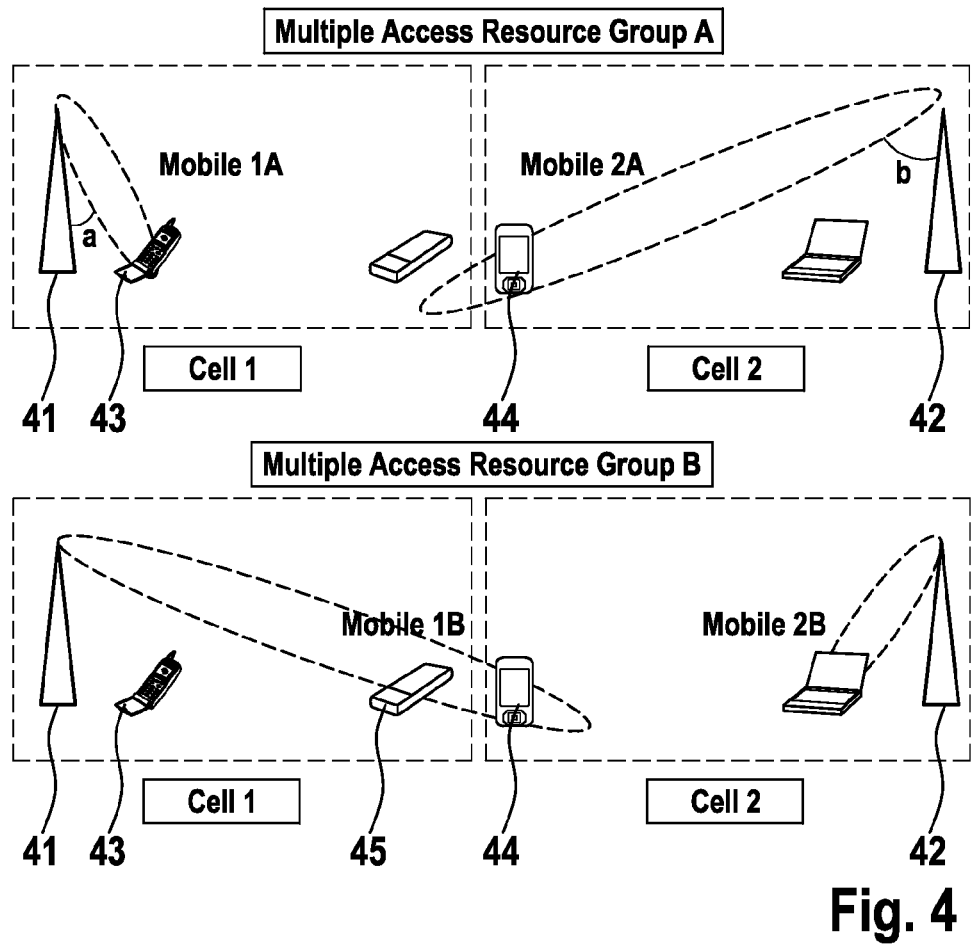
FIG. 4 an application of the present invention to interference coordination.

FIG. 4 shows an application of the present invention to interference coordination.

FIG. 4 shows two base stations 41, 42 in two neighboring cells and two terminals 43, 44. Mobile terminal 43 is close to its serving base station 41 and mobile terminal 44 is for from its serving base station 42, According to the present invention, interference between the two neighboring cells can be reduced in that the users in each cells are sorted according to their distance to the base station and addressed from their base station with beams having different elevations depending on which group the terminal belongs to. In case two groups of users ore created in a cell, a group of users being close to the base station and a group of users being for from the base station, the group of users close to the base station will receive beams from the base station having a low elevation angle $\alpha$, while the group of users for from the base station will receive beams having a high elevation angle b. This presents the advantage that beams directed to user 43 close from base station 41 will not or almost not interfere with beams directed to user 44 far from base station 42. This arrangement enables it to schedule users close to base station 41 using identical resources as for users far from base station 42 without generating too much interference. This helps for having a frequency reuse 1 system working with negligible level of interference.

It will be understood by those skilled in the art that more than two groups of users may be created around a base station. The main criteria for creating groups would be to define several angle values corresponding to concentric circles around the base station in which different elevation angles are used for reaching the user located between two concentric circles.

Figure 5:
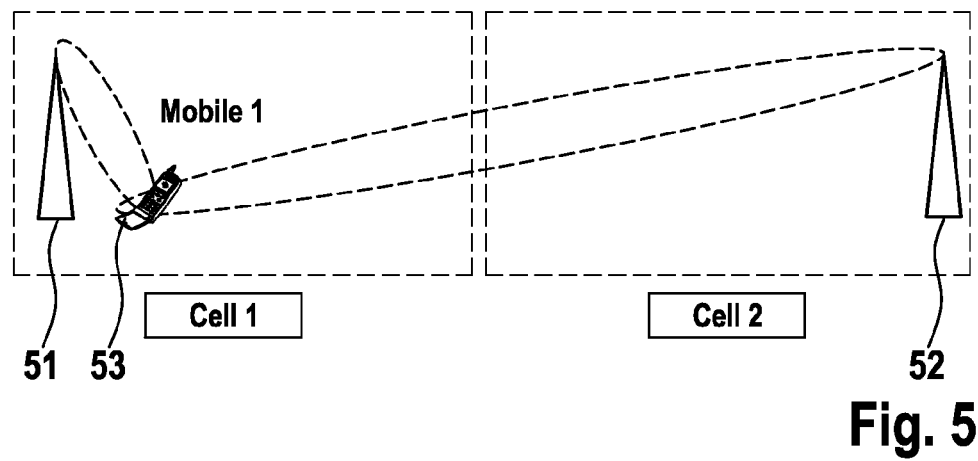
FIG. 5 an application of the present invention to multi-site coordinated Multiple Input Multiple Output algorithms.

FIG. 5 shows on application of the present invention to multi-site coordinated transmission. FIG. 5 shows 2 neighboring cells with base stations 51, 52 and one mobile terminal 53 close to base station 51. Base stations 51 and 52 perform joint transmissions towards terminal 53. This is especially the case in network MIMO or collaborative MIMO algorithms. According to the present invention, the elevation of the beam sent by base station 51 is adopted to the distance between base station 51 and terminal 53 while the elevation of the beam sent by base station 52 is adapted to the distance between terminal 53 and base station 52. This enables it to serve terminal 53 in an appropriate way especially from base station 52 without too high transmit power and then without creating too much interference. Again the complex antenna weights used for communicating between base station 51 and mobile terminal 53 needs to be adapted to the elevation and azimuth angles terminal 53 is seen from the antenna of base station 51 similarly the complex antenna weights used for communicating between base station 53 and mobile terminal 53 needs to be adapted to the elevation and azimuth angles terminal 53 is seen from the antenna of base station 52.

Figure 6:
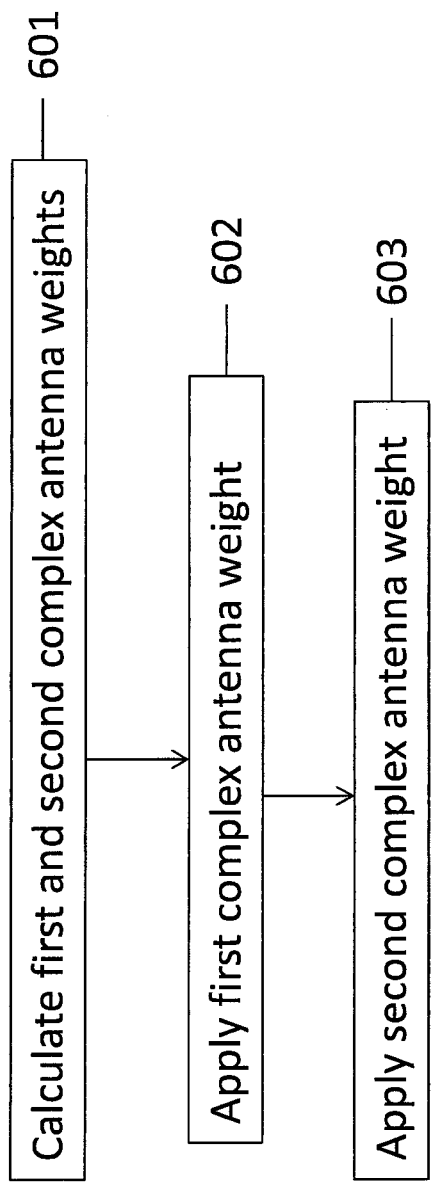
FIGS. 6-8 are flowcharts relating to aspects of the invention.

With reference to FIG. 6, step 601 shows calculating first and second complex antenna weights; step 602 shows applying the first complex antenna weight; and step 603 shows applying the second complex antenna weight.

Figure 7:
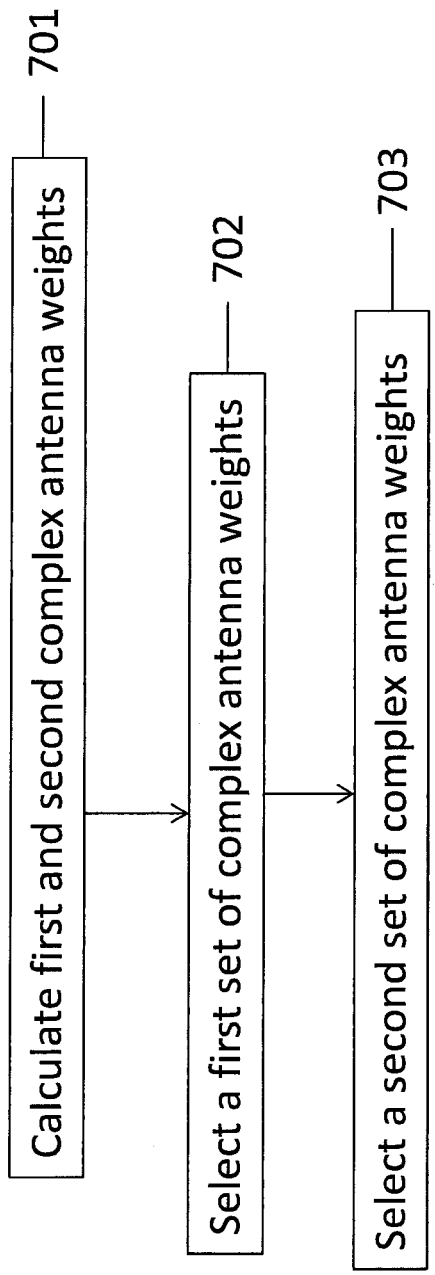

With reference to FIG. 7, step 701 shows calculating first and second complex antenna weights; step 702 shows selecting a first set of complex antenna weights; and step 703 shows selecting a second set of complex antenna weights.

Figure 8:
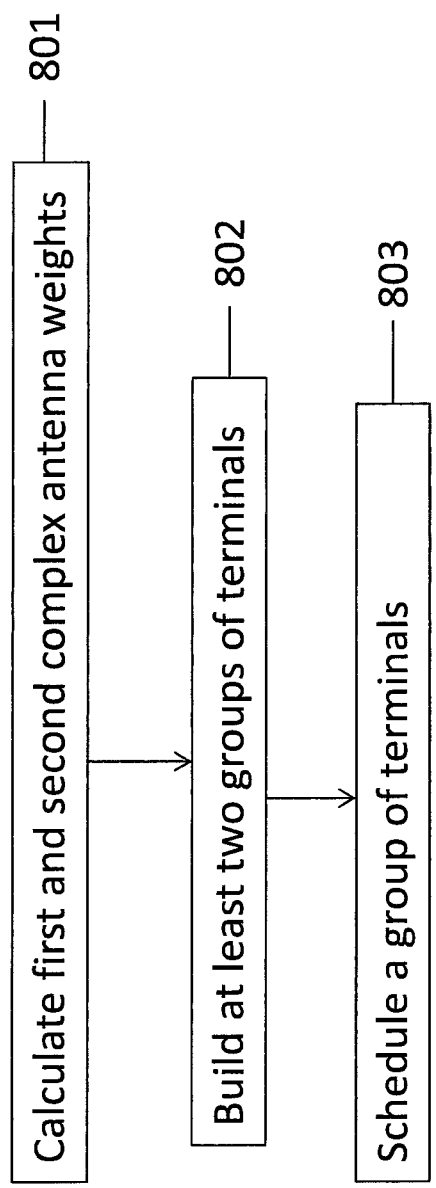

With reference to FIG. 8, step 801 shows calculating first and second complex antenna weights; step 802 shows building at least two groups of terminals; and step 803 shows scheduling a group of terminals.

FIG. 9 shows an example of first and second complex antenna weights.

The invention claimed is:

1. A method for multi-antenna signal processing at an antenna element arrangement belonging to a transceiver of a radio communication network, said antenna element arrangement comprising antenna elements in horizontal and in vertical direction, wherein multiple-antenna signal processing is configured to direct the orientation of beams in azimuth and elevation directions, wherein complex antenna weights are applied to said antenna elements, said method comprising calculating first and second complex antenna weights for each antenna element of the antenna element arrangement independently, each antenna element being controlled by a corresponding baseband signal processing chain of said transceiver, wherein the transceiver comprises at least two processing chains;

wherein the method is to be used in conjunction with inter-cell interference coordination algorithms in a cellular communication network comprising at least two adjacent base stations and a plurality of terminals, said method comprising:

building at least two groups of terminals served by each base station, said groups of terminals built depending on an elevation angle with which said terminals are seen from said base station for serving the terminals, one of said group corresponding to an elevation below a first threshold, another of said group corresponding to an elevation above a second threshold; and scheduling a group of terminals served by a first base station and having the elevation below the first threshold using the same resources as a group of terminals served by a second base station and having the elevation above the second threshold.

2. The method according to claim 1, wherein said transceiver comprises at least two horizontally arranged sets of vertically stacked antenna elements configured to generate a beam in predefined azimuth and elevation directions, said azimuth direction being reached by applying first complex antenna weights to said at least two sets of vertically stacked antenna elements, said elevation direction being reached by applying in addition second complex antenna weights to said antenna elements in said sets of vertically stacked antenna elements.

3. The method according to claim 2, wherein said beam is configured to reach a terminal having a predefined azimuth and/or elevation seen from said transceiver of said radio communication network.

4. The method according to claim 1, to be used in conjunction with coordinated multi-site transmission, a terminal receiving signals from at least two transceivers, said method further comprising the steps of:

selecting a first set of complex antenna weights from the first and second complex antenna weights for each antenna element of a first transceiver depending on the azimuth and elevation of said terminal seen from said first transceiver;

selecting a second set of complex antenna weights from the first and second complex antenna weights for each antenna element of a second transceiver depending on the azimuth and elevation of said terminal seen from said second transceiver.

5. A transceiver configured to perform multi-antenna signal processing in a radio communication network, said transceiver being connected to an antenna element arrangement with antenna elements in horizontal and in vertical direction, wherein said multiple-antenna signal processing is configured to direct the orientation of beams in azimuth and elevation directions, said transceiver configured to apply complex antenna weights to said antenna elements, said transceiver being characterized in that it further comprises at least two baseband signal processing chains configured to individually control two vertically stacked antenna elements, each chain receiving as input an input signal to which at least one of said complex antenna weights has been applied;
   wherein the transceiver is to be used in conjunction with inter-cell interference coordination algorithms in a cellular communication network comprising at least two adjacent base stations and a plurality of terminals, said transceiver further configured to:
   build at least two groups of terminals served by each base station, said groups of terminals built depending on an elevation angle with which said terminals are seen from said base station for serving the terminals, one of said group corresponding to an elevation below a first threshold, another of said group corresponding to an elevation above a second threshold; and
   schedule a group of terminals served by a first base station and having the elevation below the first threshold using the same resources as a group of terminals served by a second base station and having the elevation above the second threshold.

6. An antenna element arrangement configured to generate a beam at a transceiver of a radio communication network, said antenna element arrangement comprising antenna elements in horizontal and in vertical direction, said antenna element arrangement configured to apply complex antenna weights to said antenna elements to steer beams in an azimuth direction as well as in an elevation direction, said antenna element arrangement being characterized in that at least two vertically stacked antenna elements are each configured to be controlled by a corresponding baseband signal processing chain;
   wherein the antenna element arrangement is to be used in conjunction with inter-cell interference coordination algorithms in a cellular communication network comprising at least two adjacent base stations and a plurality of terminals, said antenna element arrangement further configured to:
   build at least two groups of terminals served by each base station, said group of terminals built depending on an elevation angle with which said terminals are seen from said base station for serving the terminals, one of said group corresponding to an elevation below a first threshold, another of said group corresponding to an elevation above a second threshold; and
   schedule a group of terminals served by a first base station and having the elevation below the first threshold using the same resources as a group of terminals served by a second base station and having the elevation above the second threshold.

7. The antenna element arrangement according to claim 6, comprising at least two horizontally arranged sets of vertically stacked antenna elements configured to generate a beam in a predefined azimuth and elevation direction, said azimuth direction being reached by applying first complex antenna weights to said at least two sets of vertically stacked antenna elements, said elevation direction being reached by applying second complex antenna weights to said antenna elements in said sets of vertically stacked antenna elements.

8. The antenna element arrangement according to claim 6, being a planar array of antenna elements arranged vertically and horizontally.

\* \* \* \* \*